May 10, 1927.
D. H. CHASON
MOTOR CONTROLLER
Filed Jan. 12, 1923
1,627,593
3 Sheets-Sheet 2
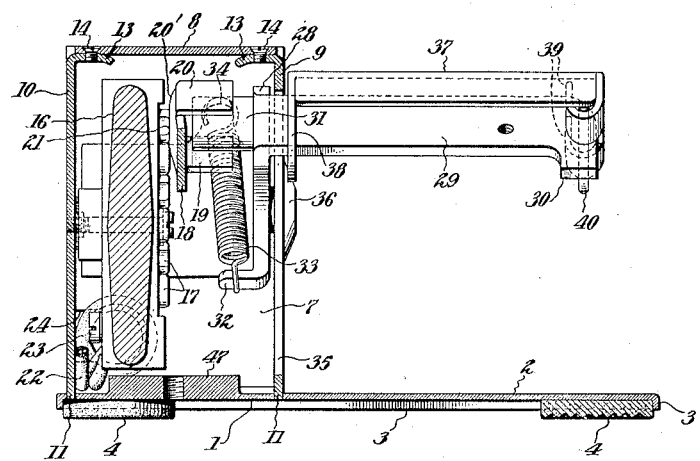
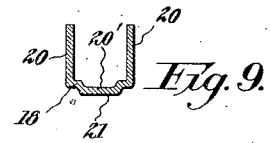
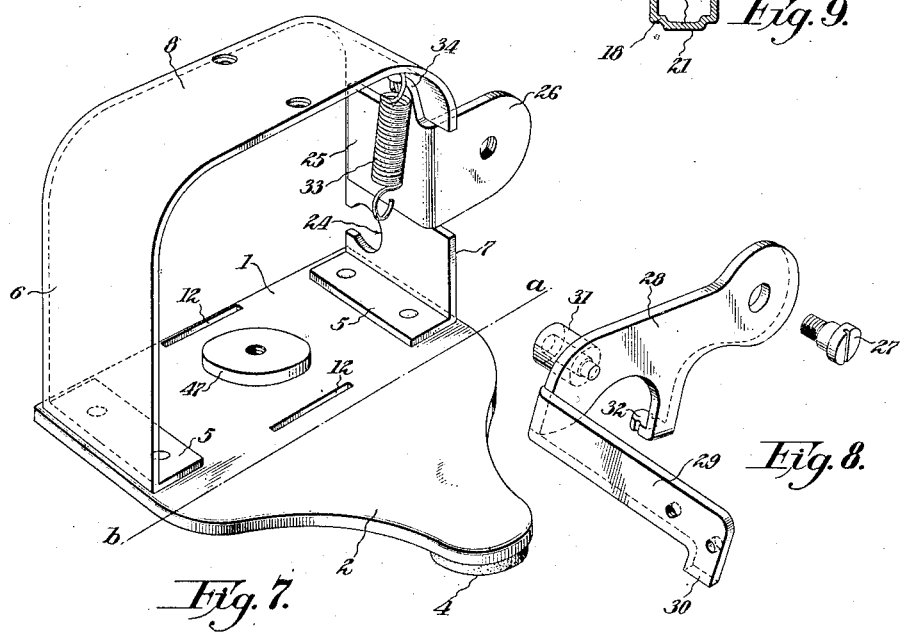
WITNESSES
INVENTOR
Daniel H. Chason
BY
ATTORNEY May 10, 1927.  1,627,593
D. H. CHASON
MOTOR CONTROLLER
Filed Jan. 12, 1923      3 Sheets-Sheet 3
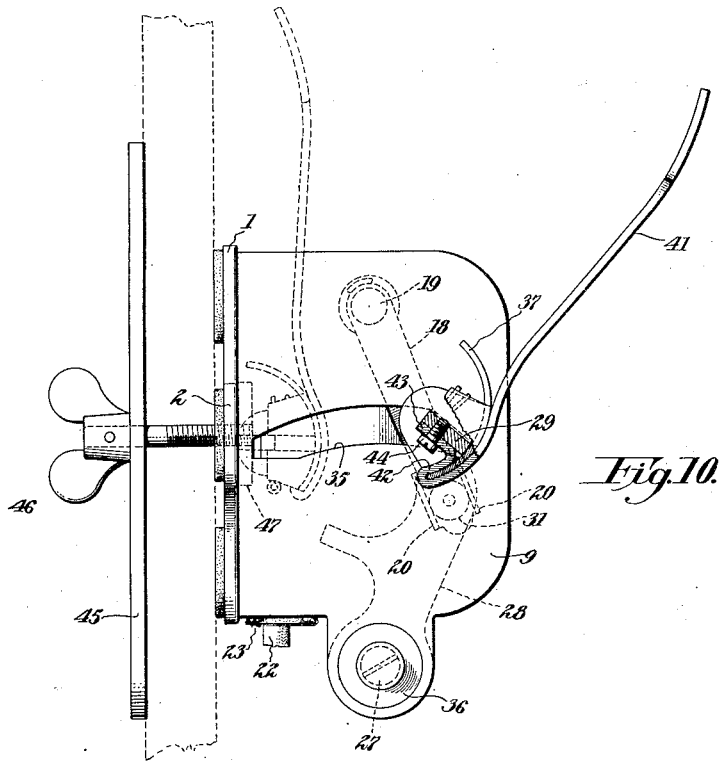
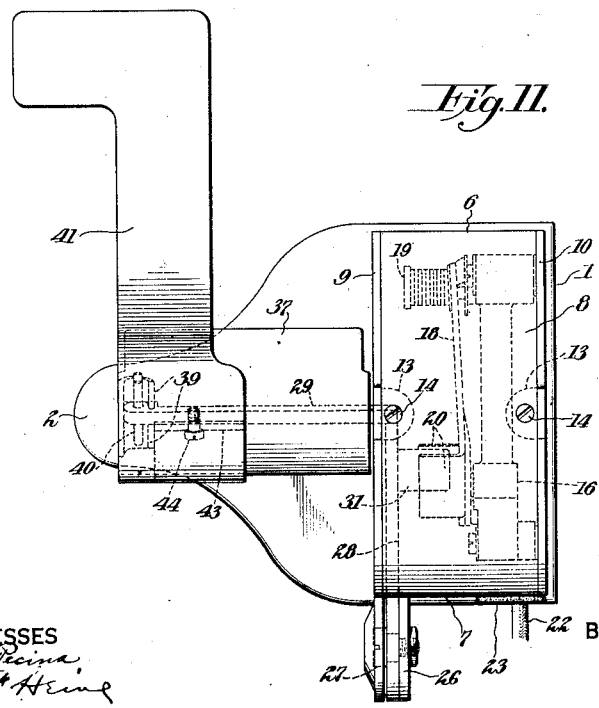
INVENTOR
Daniel H Chason,
BY Henry J Miller
ATTORNEY
WITNESSES Patented May 10, 1927.

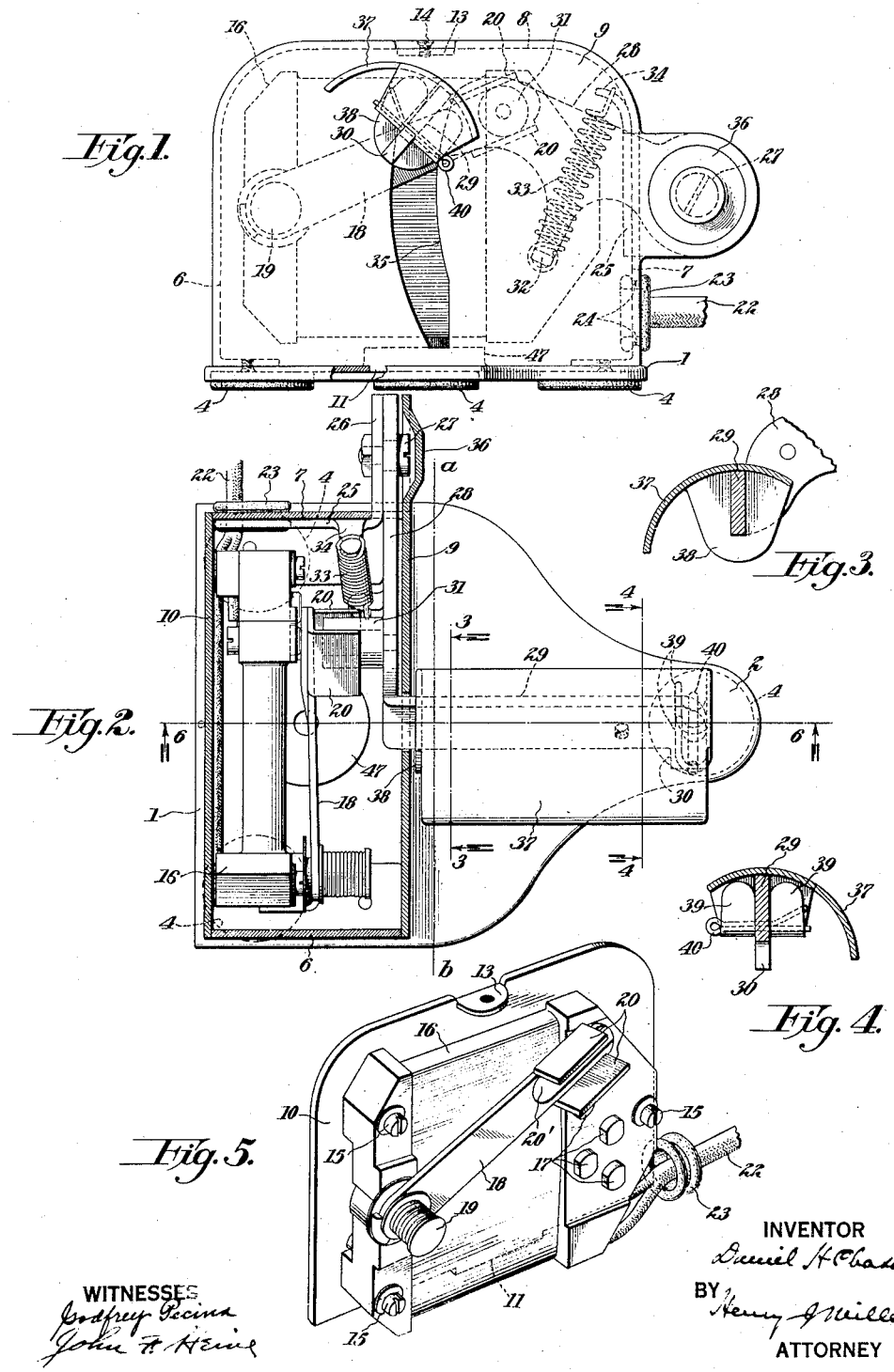

1,627,593

UNITED STATES PATENT OFFICE.

DANIEL H. CHASON, OF ELIZABETH, NEW JERSEY, ASSIGNOR TO THE SINGER MANUFACTURING COMPANY, OF ELIZABETH, NEW JERSEY, A CORPORATION OF NEW JERSEY.

MOTOR CONTROLLER.

Application filed January 12, 1923. Serial No. 612,259.

This invention relates to electric motor controllers of the foot-operated type, such as are customarily associated with sewing machine motors, and has for an object to provide a controller of minimum weight and size for a given rating.

Another object of the invention is to provide a controller which despite its light weight will not creep over the floor while being used.

Another object of the invention is to provide a motor-controller which is inexpensive to manufacture.

A further object of the invention is to provide a motor-controller which is not tiring to the operator.

Still further, the invention has for an object to provide a knee-operated controller converted from a foot-operated controller.

To the attainment of the ends in view, the controller casing is made up in the form of a box with relatively wide side walls and relatively narrow end walls rising substantially vertically from a rectangular base having at one of its longer sides a lateral extension which is preferably symmetrical with respect to the transverse center line of the base. Preferably, the casing is made entirely from sheet-metal blanks of simple, easily nested shapes which may be punched from stock with a minimum of waste. The side walls of the casing are preferably made removable and one of them has mounted upon it a variable resistance unit of well known form including a shiftable contactor arm. An L-shaped pedal lever is pivotally mounted upon one of the end walls of the casing with one of its arms parallel to and between the removable side walls. The other arm of the L-shaped pedal lever extends outwardly through a slot in the adjacent side cover-plate; such slot being concentric with the fulcrum of the pedal lever. The pedal lever is operatively connected to the contactor of the variable resistance unit and a spring is provided to return the pedal lever to "off" or elevated position. The outward extension of the pedal lever lies substantially directly above the centralized lateral extension of the base, thus centralizing the operating pressure relative to the base and its extension, taken as a whole. This provision goes far toward preventing creeping of the controller on the floor when being operated. The base of the casing is preferably provided with a threaded aperture adapted to receive a thumb-screw for securing the controller in position for knee-operation on a sewing machine stand and, for knee-operation, an extension is preferably provided which may be detachably connected to the pedal lever; such extension increasing the effective length of the power-arm or the pedal-lever and reducing the reactionary spring-pressure against the knee, as is desirable for knee operation.

In the accompanying drawings, Fig. 1 is a side elevation of a motor-controller embodying the invention. Fig. 2 is a horizontal section through the controller casing, showing the working parts and base in plan. Figs. 3 and 4 are sections on the lines 3—3 and 4—4, respectively, Fig. 2. Fig. 5 is a perspective view of the circuit controlling or variable resistance element on its supporting cover-plate. Fig. 6 is a vertical section on the line 6—6, Fig. 2. Fig. 7 is a perspective view of the controller casing with the cover-plates removed. Fig. 8 is a perspective view of the L-shaped pedal lever. Fig. 9 is a transverse section through the contactor lever of the variable resistance element. Figs. 10 and 11 are, respectively, front and side elevations of the controller as connected for knee-shift operation on a vertical support, such as is afforded by one of the cast iron legs or end walls of a sewing machine stand or cabinet.

In the preferred embodiment of the invention, as illustrated, the controller casing is made up of sheet-metal blanks of simple shapes which may be punched from sheet stock with a minimum of waste. The base may be considered as divided by the line $a$—$b$, Figs. 2 and 7, into a main rectangular portion 1 and a lateral extension 2 adjoining one of the longer sides of the main rectangular portion. The base-extension 2 is preferably of symmetrical outline with its axis of symmetry coincident with the line 6—6, Fig. 2, which is drawn transversely and centrally of the main rectangular portion 1 of the base. The base 1 and extension 2 are stiffened by the downturned marginal rib 3 and suitable rubber feet or pads 4 are preferably secured to the under side of such base and extension.

Secured to the main rectangular portion 1 of the base by suitable means, such as screws, rivets or spot-welds, are the inturned feet 5, Fig. 7, of the inverted U-shaped casing element affording the relatively narrow end walls 6, 7, and the top wall 8 of the controller casing which is of flattened box-like form with its front and rear side walls of greatest area 9 and 10, disposed vertically or at right angles to the plane of the base 1. The walls 9 and 10 are preferably removably secured in position by providing their lower edges with tongues 11 entering the slots 12 in the base 1 and their upper edges with inwardly bent tongues 13 into which are threaded screws 14 passing through the top wall 8 of the casing.

The rear side wall 10 is preferably formed with ventilating perforations, not shown, and has secured thereto by screws 15, Fig. 5, a circuit controlling device preferably in the form of a variable resistance unit 16 including a plurality of resistor connected contact points 17 over which play the contactor lever 18 pivoted at 19. A variable resistance unit of this type is well known in the art and is disclosed, for example, in the patent to Diehl, No. 1,369,407, of February 22, 1921. The contactor lever 18 is preferably constructed of one piece of sheet-metal, as disclosed in the patent to Zabriskie, No. 1,437,629, of December 5, 1922, with the exception that the spaced cheek pieces 20 are formed nearer the free end of the lever 18, which latter is indented between the cheek pieces at 20' to form the contact surface 21, Fig. 9. The conductor-cord 22 connected to the rheostat unit 16 passes through the peripherally grooved rubber ring 23 which is seated in the aperture 24 in the end wall 7 of the casing.

Spot-welded or otherwise secured to the end wall 7 of the casing is the shank 25 of the outwardly bent ear 26 to which is fulcrumed by means of the screw 27 one arm 28 of an L-shaped pedal lever struck up from sheet-metal; the other arm 29 being bent at right angles to the arm 28 and being formed with a toe 30 to limit the downward movement of the pedal lever by striking the extension 2 of the base.

The arm 28 of the pedal lever has secured thereto a roller pin 31 which is received between the cheek pieces 19 of the rheostat contactor lever 18. This connection between the levers 18 and 28 is effected by the mere act of placing the rear cover-plate 10 and resistance element carried thereby in position to close the rear side of the casing. The lever 28 is also formed with a downwardly and inwardly extending arm 32 to the notched end of which is secured the lower end of a coil spring 33 the upper end of which is anchored to the similarly notched upwardly extending arm 34 formed on the shank 25 of the ear 26. The function of this spring is to return the pedal lever to its elevated or "off" position when pressure thereupon is relieved.

The outwardly directed arm 29 of the pedal lever extends in a direction substantially parallel to the plane of the base and is disposed substantially centrally over such base and extension, as shown in Fig. 2. The front side wall 9 of the casing is formed with a curved slot 35 which is concentric with the pivot-screw 27 and through which the arm 29 of the pedal lever projects. It will also be noted that the front wall 9 has an extension 36 in the form of an ear which is cupped to cover the screw 27, as shown in Fig. 2.

Fitted to the arm 29 of the pedal lever is a pedal-piece 37 in the form of a cylindrically curved piece of sheet-metal having at its inner end an ear 38 apertured to fit upon the arm 29. The outer end of the pedal-piece is formed with tongues 39 which are spaced apart sufficiently to receive the arm 29 between them. The free ends of the tongues are bent back upon themselves around a removable pin 40 passing transversely through the arm 29. By removing the pin 40 the pedal-piece may be removed endwise of the arm 29.

For comfortable knee-operation and effective control of the motor speeds under knee-operation, the range of movement of the part of the operating lever engaged by the knee should be greater and the reactionary spring-pressure against the knee should be less than for foot operation. Thus, for knee operation, an extension arm 41 is provided to increase the effective length of the power-arm of the pedal-lever 28. This extension arm is preferably formed at one end with a return bent portion 42, Fig. 10, which is hooked around one lateral edge of the pedal-piece 37 and is formed with a reversely bent ear 43 through which a screw 44 may be passed to secure such ear flat against the arm 29 of the pedal-lever. For knee operation the controller may be secured to a vertical support, such as a sewing machine stand or cabinet, in proximity to the operator's knee by means of the clamp-plate 45 and thumb-screw 46 which is threaded into a portion of the base 1, preferably thickened by means of a circular plate 47 spot-welded or otherwise secured thereto.

Compactness is afforded by providing a flattened casing and resistance unit set edgewise upon the base and by extending the pedal through one of the wider side walls of the casing; the pedal being parallel to the base and normal to the flattened casing, and between the planes of the top and bottom of the casing.

The controller is remarkably light in weight, yet demonstration has shown that it will not creep over the floor while being operated. The centralization of the pedal over the base is doubtless responsible in a large measure for the non-creeping property of the controller.

The controller is particularly well adapted, because of its compactness and lightness in weight, to be stored under the bracket-arm of a sewing machine and be transported with the machine head in the usual hand-carrying case.

Having thus set forth the nature of the invention, what I claim herein is:—

1. An electric motor-controller comprising a sheet-metal base, an inverted U-shaped sheet-metal casing element secured to said base, removable sheet-metal cover-plates for closing the open sides of the U-shaped casing element, a variable resistance unit mounted upon one of said cover-plates and including a shiftable resistance regulating element, a pedal-lever fulcrumed on said casing and connected within the latter to said shiftable element, said pedal-lever having an angular extension, the other cover-plate having a slot substantially concentric with the fulcrum of the pedal-lever through which the angular extension of said lever projects.

2. An electric motor-controller comprising a base, a casing having a slotted side wall, a pedal-lever projecting outwardly through said slotted side wall and carrying at its free end a removable transverse pin, a variable resistance element connected to said pedal-lever within said casing and a pedal-piece having at one end a slotted ear entered by said pedal-lever, the other end of said pedal-piece being formed with spaced tongues between which the pedal-lever extends, said tongues being bent back upon themselves to embrace said transverse pin.

3. An electric motor-controller comprising a base, a box-like casing carried by said base and comprising two side and two end walls, both side walls being removable and one of them being slotted, a variable resistance unit mounted on the non-slotted removable side cover-plate, and a pedal-lever fulcrumed on one of the end walls of the casing and extending through the slot in the slotted side cover-plate and operatively connected to said variable resistance unit.

4. A sewing machine motor-controller comprising a casing including a base adapted to rest upon the floor or be secured to a sewing machine stand, a variable motor-circuit controller element housed within said casing, a spring-pressed pedal-lever connected to operate said element, and a knee-shift extension element connected to said pedal-lever to increase the length of the power-arm thereof for knee-shift operation.

5. A convertible foot or knee-operated motor-controller comprising a casing including a base adapted to rest upon the floor or be secured to a sewing machine stand, a variable circuit controller element housed within said casing, an L-shaped spring-pressed pedal-lever having one of its arms connected to operate said element, and a knee-shift extension detachably connected to the other arm of said pedal-lever to increase the effective length of the power-arm thereof for knee-shift operation.

In testimony whereof, I have signed my name to this specification.

DANIEL H. CHASON.